United States Patent
Kamada et al.

[11] Patent Number: 5,966,149
[45] Date of Patent: Oct. 12, 1999

[54] PRINTING APPARATUS IN WHICH REGISTRATION ADJUSTMENT BETWEEN A PLURALITY OF PRINT HEADS IS PERFORMED

[75] Inventors: Masashi Kamada, Irvine, Calif.; Takayuki Ninomiya, Ichikawa; Kazuhiko Morimura, Yokohama, both of Japan

[73] Assignee: Canon Kabushiki Kaisha, Tokyo, Japan

[21] Appl. No.: 08/904,866

[22] Filed: Aug. 1, 1997

[30] Foreign Application Priority Data

Aug. 5, 1996 [JP] Japan .................................. 8-205704

[51] Int. Cl.[6] .................................................. B41J 2/345
[52] U.S. Cl. ............................................. 347/42; 347/191
[58] Field of Search .................................. 347/42, 14, 17, 347/19, 116, 191, 232, 234

[56] References Cited

U.S. PATENT DOCUMENTS

| 4,721,969 | 1/1988 | Asano ........................................ 347/116 |
| 4,977,410 | 12/1990 | Onuki et al. ............................. 347/191 |
| 5,528,272 | 6/1996 | Quinn et al. ............................... 347/42 |

FOREIGN PATENT DOCUMENTS

| 0512799 | 11/1992 | European Pat. Off. . |
| 0710921 | 5/1996 | European Pat. Off. . |

Primary Examiner—N. Le
Assistant Examiner—Anh T. N. Vo
Attorney, Agent, or Firm—Fitzpatrick, Cella, Harper & Scinto

[57] ABSTRACT

When a position deviation of more than ½ pitch of ejection port pitch is generated by a difference in thermal expansion between ejection ports of a low temperature line head and ejection ports of high temperature line head, a dummy data is inserted in part of ejection data arrangement, so that ejection data inherent in the arrangement is shifted by one ejection port unit to be assigned to other ejection ports This reduces position deviation between dots formed by individual heads according to the data to less than ½ pitch.

13 Claims, 6 Drawing Sheets

PRINTING APPARATUS IN WHICH REGISTRATION ADJUSTMENT BETWEEN A PLURALITY OF PRINT HEADS IS PERFORMED

BACKGROUND OF THE INVENTION

1. Field of the Invention

The present invention relates to a printing apparatus, and more specifically to a registration adjustment of a full-line head in which printing elements such as ink ejection ports and the like are arranged corresponding to a width of a paper which is fed.

2. Description of Prior Art

As an example of a printing apparatus using a plurality of full-line heads of this kind, a full-color page printer is known which is equipped with heads for respectively ejecting four color inks of black, cyan, magenta, and yellow by utilizing generation of bubbles by heat energy (hereinafter referred to as thermal line head). An example of a structure thereof will be described below.

FIG. 1 is a block diagram showing a control arrangement of a full-color printer equipped with a thermal ink jet line head, hereinafter referred to as a thermal line head for each ink of black, cyan, magenta, and yellow having ink ejection ports in a density of 600 dpi over a range of about 8 inches corresponding to a paper width when, for example, an A4-sized print paper is used to be fed in the longitudinal direction thereof.

In the FIG., a reference numeral 1 denotes a CPU for executing operation control of the entire apparatus and data processing, a reference numeral 2 denotes a ROM for storing control programs of the CPU 1, fonts, and various data for processing, a reference numeral 3 denotes a RAM for used as a work area for processing of CPU 1 such as temporary storage of various data, a reference numeral 4 denotes a data receiving unit for making communication control with external devices (not shown) such as a host computer to receive data from the external devices, a reference numeral 5 denotes a DMA/RAM controller for performing DMA transfer of data from the data receiving portion 4 to the RAM 3, performing DMA transferring of image data stored in the RAM 3 to a line head controller 9, and controlling access of the RAM 3 by the CPU 1, and a reference numeral 6 denotes a non-volatile memory such as an EEPROM for storing parameters specific to the printer. Reference numerals 7K, 7C, 7M, and 7Y respectively denote thermal line heads for individually ejecting black (K), cyan (C), magenta (M), and yellow (Y) inks to a printing medium such as printing paper to print an image, reference numerals 8K, 8C, 8M, an 8Y denote line head drivers for individually driving the thermal line heads 7K, 7C, 7M, and 7Y, and a reference numeral 9 denotes the line head controller for performing image data transferring to the individual line head drivers 8K, 8C, 8M, an 8Y, generating of heat pulse signals, and the like according to control signals from the CPU 1.

A line feed motor driver 10 and a line feed motor 11 driven by the driver 10 perform rotation drive of a feed roller (not shown) according to control signals supplied from the CPU 1, thereby performing movement of the printing medium in a sub-scanning direction, that is, paper feed.

FIG. 2 is a block diagram showing details of the line head controller 9 and the line head driver 8. For simplicity, the FIG. shows only an arrangement for one color of ink.

In the line head controller 9 shown in FIG. 2, a reference numeral 91 denotes a heat pulse generation portion for generating pulses for driving the thermal line head in synchronization with the drive of the line feed motor, a reference numeral 92 denotes an image data latch for receiving image data stored in the RAM 3 through the DMA/RAM controller 5 (see FIG. 4), a reference numeral 93 denotes a parallel/serial converter for, to data from the image data latch 92, adding offset data relating to a beginning ejection port, that is, offset data from a reference ejection port to an end most ejection port whose data showing "ejection" in the ejection port row of the thermal line head, and thereafter performing parallel/serial conversion to serially transmit a serial data to the line head driver 8, and a reference numeral 94 denotes an offset setting register for setting the offset data relating to the beginning ejection port. On the other hand, in the line head driver 8, a reference numeral 81 denotes a serial/parallel converter for performing serial/parallel conversion for the serial data, a reference numeral 82 denotes a gate for performing OR operation between an output of the serial/parallel converter 81 and heat pulse from the heat pulse generation portion 91, and a reference numeral 83 denotes a transistor array for respectively supplying an electric current to an electro-thermal conversion element of the thermal line head according to an output of the gate 82.

Next, a control procedure in the above prior art arrangement will be described with reference to FIGS. 1 and 2.

First, data inputted through the data receiving unit 4 is temporarily stored in the RAM 3 through the DMA/RAM controller 5, and an analysis of command, image data, character code is made by the CPU 1 according to a program stored in the ROM 2. The data stored in the RAM 3 is then converted into ejection data by the CPU 1, and sequentially stored in the RAM 3. When development of the ejection data in the RAM for one page is completed or a print instruction is inputted from the host computer as the external devices, the line feed motor 11 is driven by the line feed motor driver 10 and, at the same time, the eject data stored in the RAM 3 is transferred to the serial/parallel converter 81 of the line head driver 8 through the DMA/RAM controller 5 and the parallel/serial converter 93 of the thermal line head control unit 9. When the transfer of ejection data of one line is completed and the line feed motor rotates at a predetermined amount, a heat pulse signal is sent from the heat pulse generation portion 91 of the line head controller 9 to the gate 82 of the line head driver 8, which switching drives the transistor array unit 83 to cause the electro-thermal conversion element of the corresponding ejection port of the thermal line head to generate heat energy, and the ink is ejected from the ejection port by bubbles produced thereby.

The four thermal line heads 7K, 7C, 7M, and 7Y are arranged in the sub-scanning direction which is a feed direction of the printing paper. Therefore, it is necessary that the ejection data is transferred at a timing according to the distance between the individual thermal line heads in the sub-scanning direction with respect to the individual thermal line heads so that a plurality of ink dots is overlappedly formed at the same position on the paper. For example, when the spacing in the sub-scanning direction between the individual ejection ports of the individual thermal line heads is 1 inch and the resolution of dots formed in the sub-scanning direction is 600 dpi, if yellow and magenta are to be overlapped at a position to make red, yellow is first ejected to form a dot, and after the printing paper is fed by 1 inch in the sub-scanning direction, the magenta ink ejected to form an overlapped dot. In other words, the ejection data when ejecting magenta ink at the same time of ejecting the yellow ink must be data of 600 dots (600 rasters) before.

Next, a registration adjustment in the above prior art arrangement will be described.

A registration adjustment is a procedure for reducing a deviation of deposited position of ink droplets ejected by different thermal line heads to a small value or zero, and includes an adjustment in the sub-scanning direction and an adjustment in the main scanning direction which is the arrangement direction of the ejection ports. In general, when the deviation is not less than ½ the dot diameter, the image quality may be degraded.

A cause of generation of deviation in the sub-scanning direction is a mounting error of the thermal line head or feeds fluctuation of printing medium. The deviation in the subscanning direction is adjusted by providing an adjustment mechanism in the mounting unit or by making ejection timing of each thermal line head variable.

On the other hand, the cause of deviation in the main scanning direction is mainly a mounting error of the thermal line head, and the deviation can be adjusted by providing an adjustment mechanism in the mounting unit to adjust a portion of the ejection port of individual heads. Further, when the printable width of the individual thermal line heads, that is, the arrangement width of the ejection ports is longer than a width required for printing, as shown in FIG. 3, an offset can be adjusted for each head with respect to the beginning ejection port, thereby correcting a mounting error between individual thermal line heads to reduce deviation of registration.

As described above, in the full-color page printer equipped with the plurality of thermal line heads, it is necessary to position the dots of individual colors as exact as possible. In the case of printing with a resolution of 600 dpi in the main scanning direction shown in the above prior art example, since a width allocated to 1 dot, that is, a dot pitch, is about 42 $\mu$m, if the dot position is deviated by more than 21 $\mu$m or a half of the dot pitch, the image quality is degraded.

Incidentally, an exact adjustment of relative positions of the individual thermal line heads can be performed relatively easily at a delivery from the factory. However, in a normal operation environment, temperature of the thermal line head may be changed due to a change in ambient temperature or printing operation. When thermal expansion occurs in various parts of the head due to the temperature change, the following problems may be caused. For example, in the case that a base plate of the thermal line head is made of aluminum, since the thermal expansion coefficient of aluminum is about $2 \times 10^{-5}/°$ C., the head length is increased at a rate of about 4 $\mu$m/° C. in a printer for A4-sized paper. In this case, if the individual thermal line heads are at the same temperature, since the relative positions in the main scanning direction are not changed, no problem occurs in the print quality. However, if there is a temperature difference of more than 5.2° C., the above described position deviation tolerance of 21 $\mu$m that can maintain the print quality is exceeded, resulting in considerable degradation in image quality.

On the other hand, it is very difficult to keep the individual thermal line heads within such a narrow temperature range, and in order to achieve this, a large scale temperature control apparatus must be provided, which may lead to an increase in cost.

SUMMARY OF THE INVENTION

An object of the present invention is to provide a printing apparatus which can suppress deviation between dots formed by individual heads even when a difference in thermal expansion is generated by a temperature difference between individual print heads.

Another object of the present invention is to provide a printing apparatus which can shift printing elements driven based on corresponding drive data of individual heads to each other even when a position deviation more than a predetermined value occurs between corresponding printing elements of the individual heads due to a difference in thermal expansion caused by a temperature difference between the individual heads, by inserting a dummy data into the drive data of the individual printing elements, thereby suppressing position deviation of dots formed according to the corresponding drive data to less than a predetermined value.

In a first aspect of the present invention, there is provided a printing apparatus for performing printing on a printing medium, by using a plurality of print heads each having a plurality of printing elements arranged in a predetermined direction, comprising:

head temperature data obtaining means for obtaining temperature data of each of the plurality of print heads;

driving data supply means for supplying driving data for driving the plurality of printing elements of each of the plurality of print heads to the each of the plurality of print heads in accordance with arrangement of the plurality of printing elements; and dummy data insertion means for inserting dummy data into the driving data supplied by the driving data supply means based on the temperature data of each of the plurality of print heads obtained by the head temperature data obtaining means.

In a second aspect of the present invention, there is provided a position deviation adjusting method of a print head in a printing apparatus using a plurality of the print heads each having a plurality of printing elements arranged in a predetermined direction and performing printing on a printing medium, the method comprising the steps of:

obtaining a temperature data of each of the plurality of print heads; and inserting a dummy data into a driving data supplied in accordance with arrangement of the plurality of printing elements and used for driving the plurality of printing elements, on a basis of temperature data obtained in each of the plurality of print heads.

DESCRIPTION OF THE PREFERRED EMBODIMENT

An embodiment of the present invention will be described with reference to the drawings.

Figure 4:
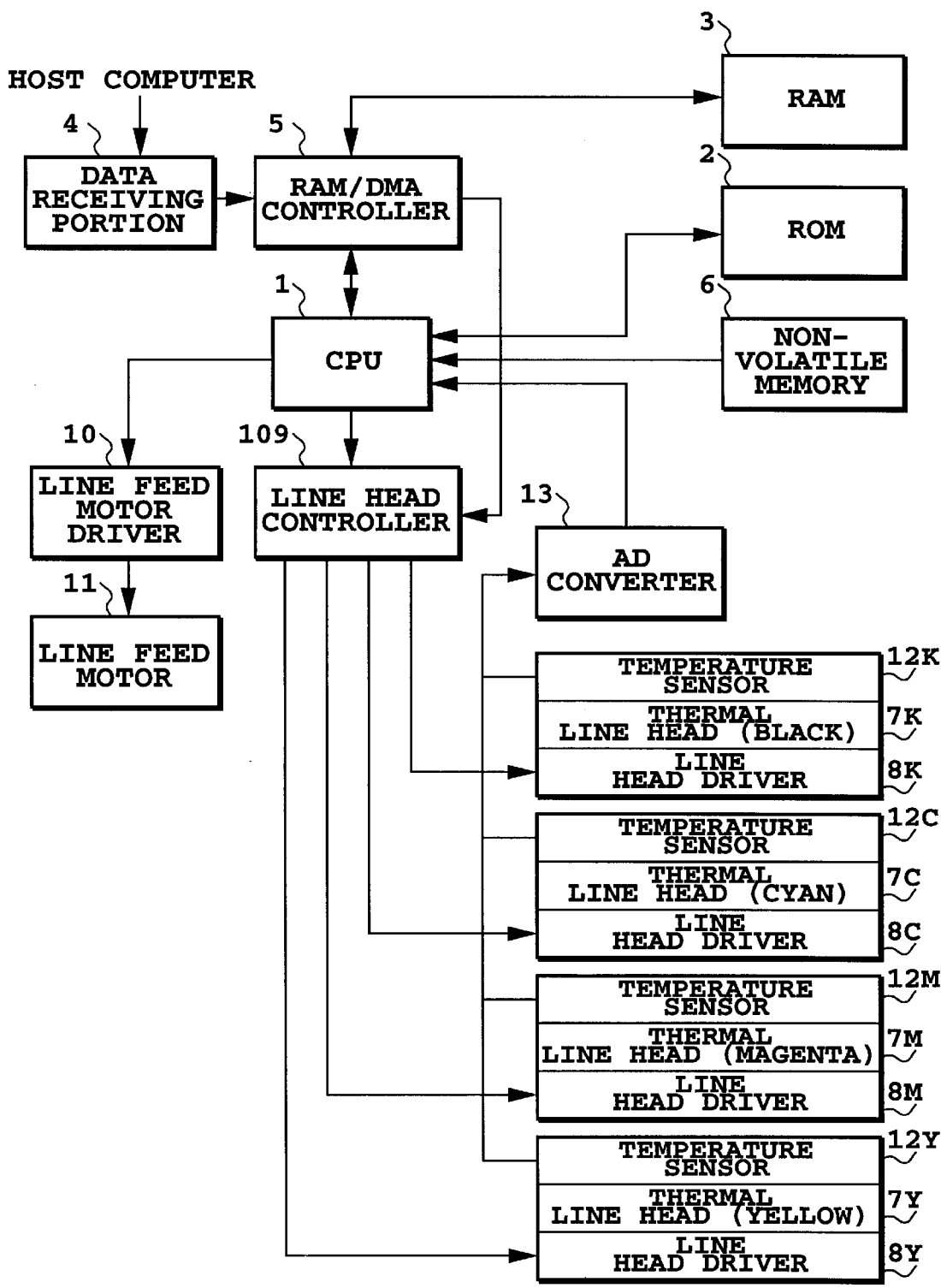
FIG. 4 is a block diagram showing a control arrangement of a thermal line printer according to an embodiment of the present invention.
Figure 5:
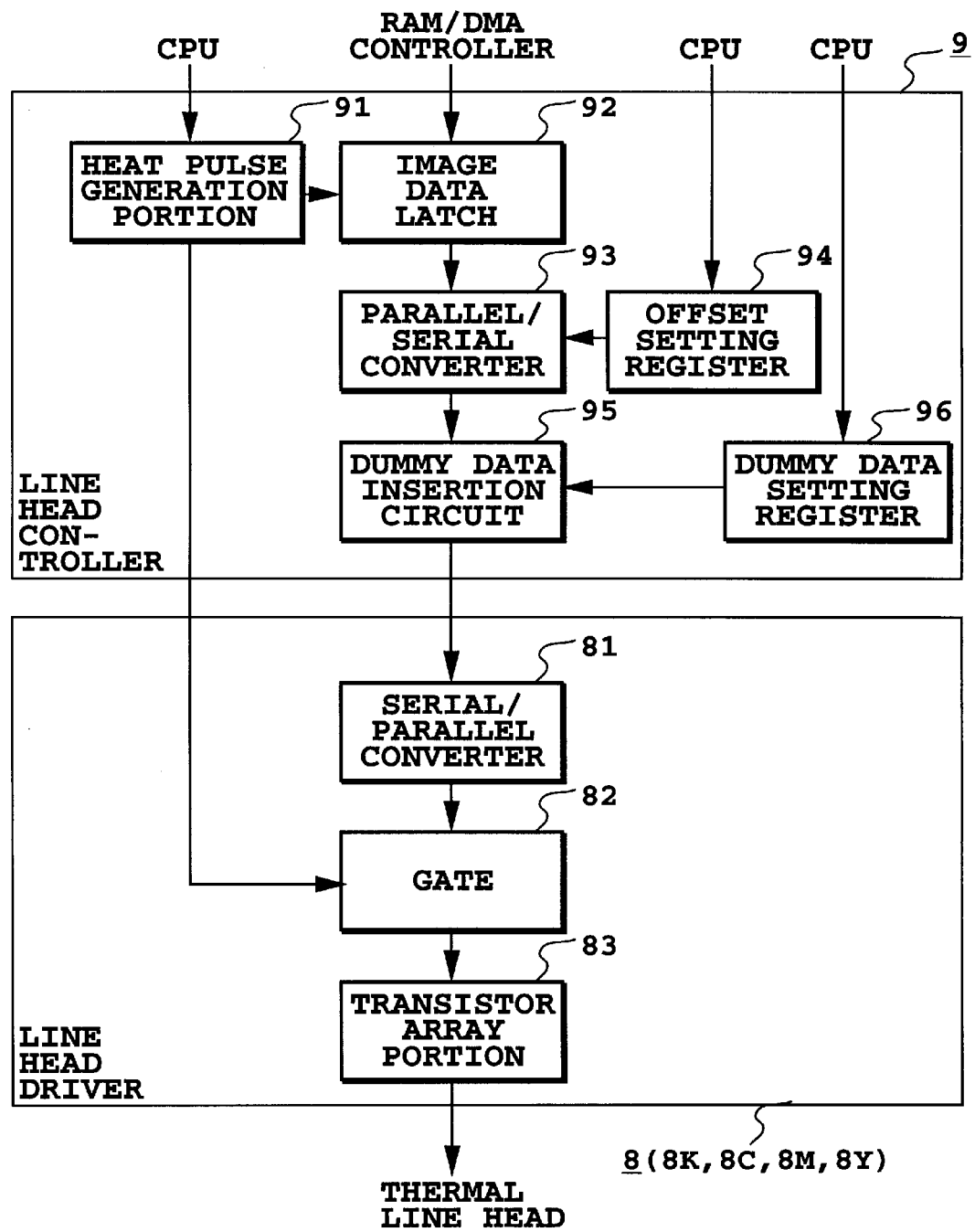
FIG. 5 is a block diagram showing details of a line head driver and a line head controller of the thermal line printer shown in FIG. 4.

FIG. 4 is a block diagram showing a control arrangement of an ink jet printer according to an embodiment of the present invention, and FIG. 5 is a block diagram showing details of a line head controller 9 and a line head driver 8 shown in FIG. 4.

Figure 1:
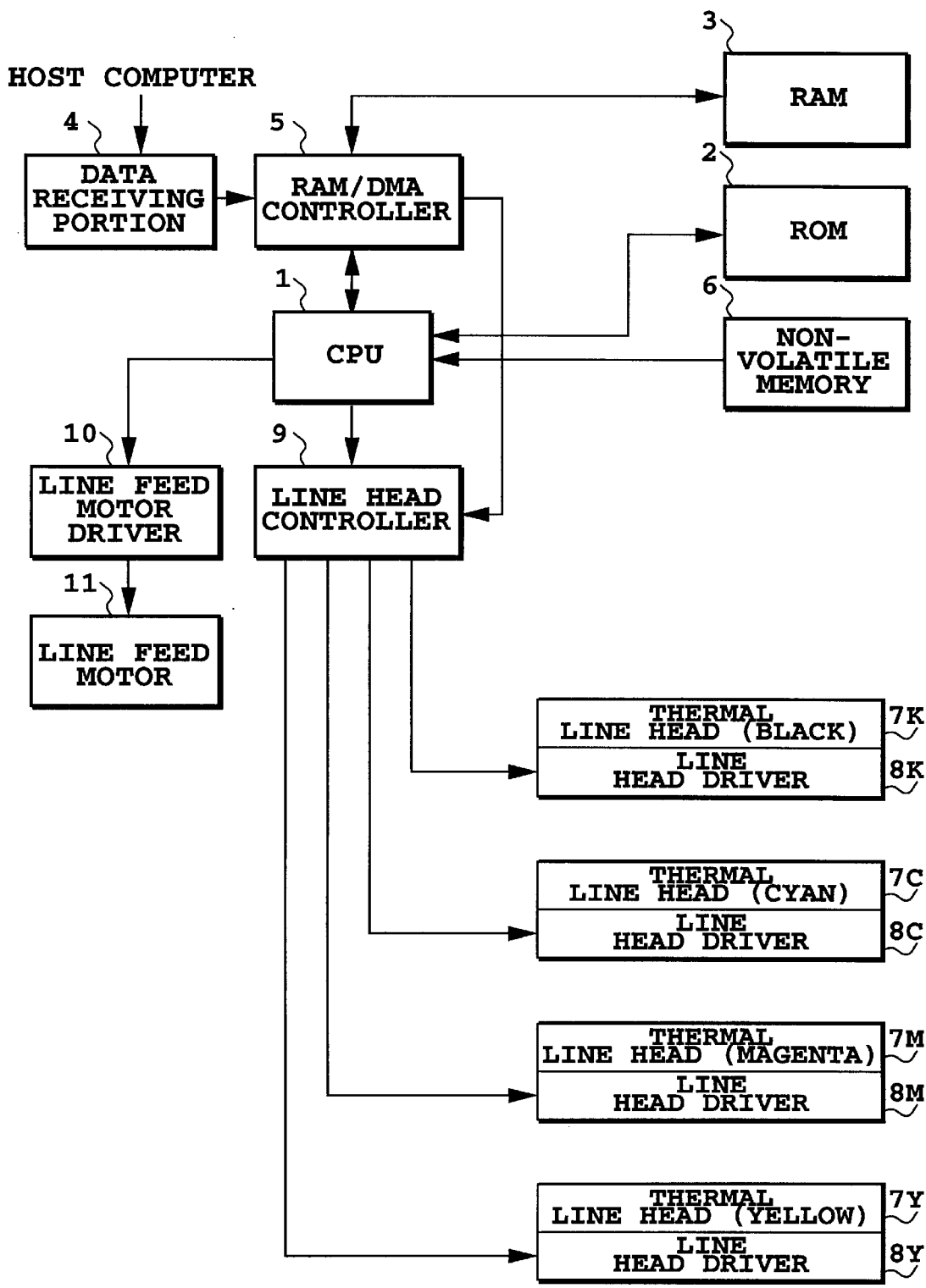
FIG. 1 is a block diagram showing a control arrangement of a prior art thermal line printer.
Figure 2:
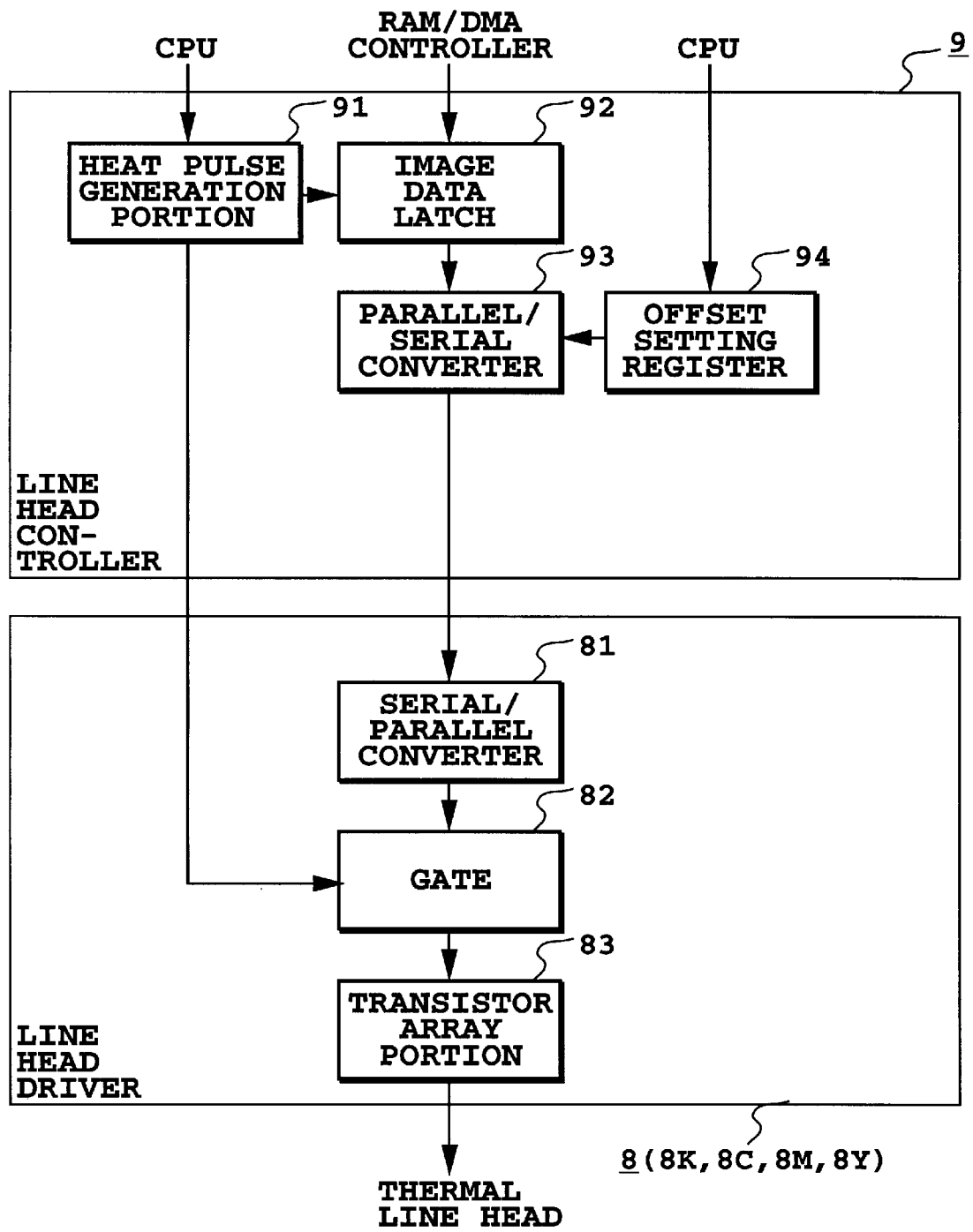
FIG. 2 is a block diagram showing details of a line head driver and a line head controller of the thermal line printer shown in FIG. 1.
Figure 3:
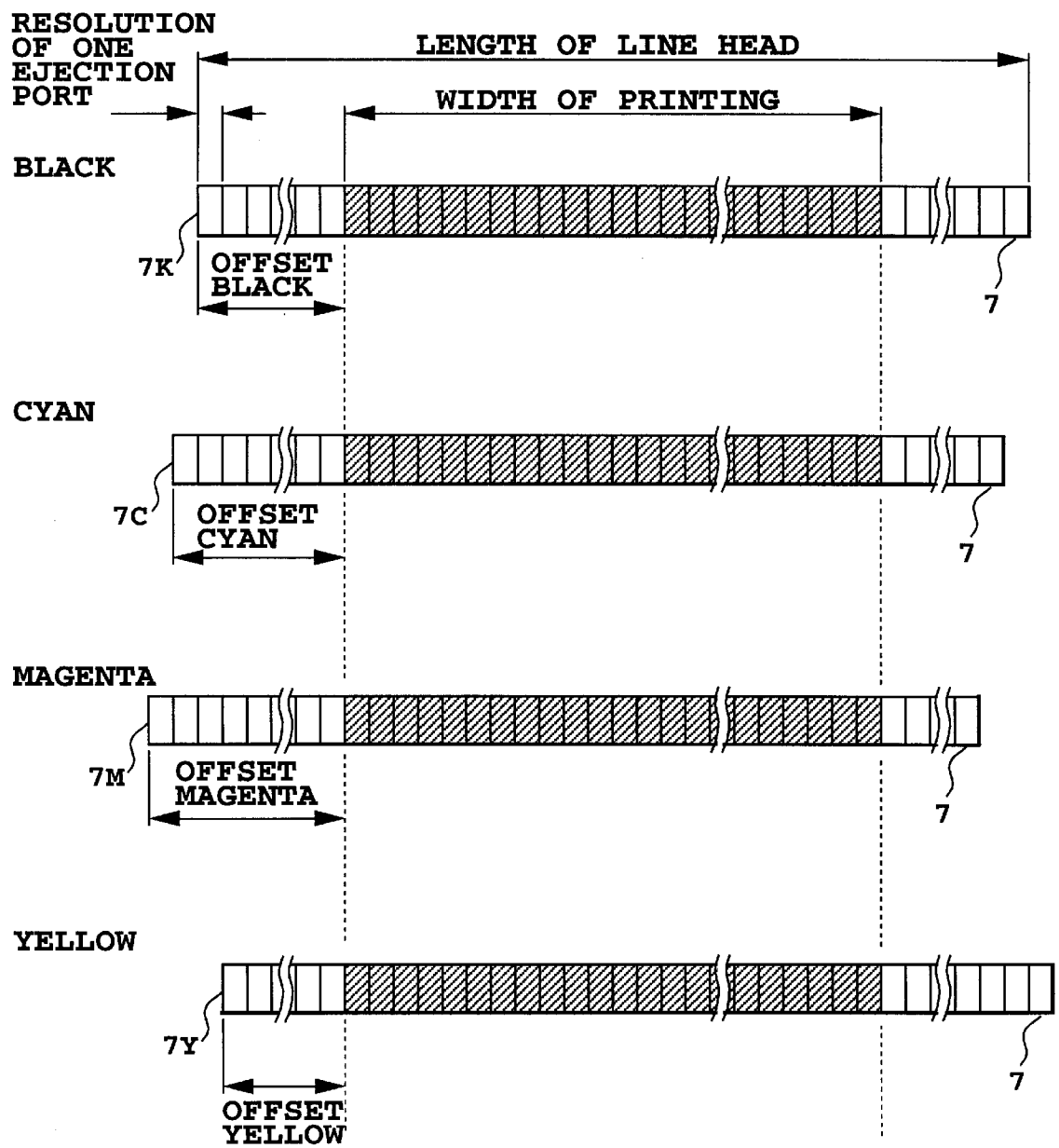
FIG. 3 is a schematic view for explaining a registration adjustment between individual heads according to prior art.

The present embodiment in these FIGS. differs from the structure of the prior art shown in FIG. 1 and FIG. 2 at following points. As shown in FIG. 4, a temperature sensor 12 is mounted close to each thermal line head 7, and an AD converter 13 is provided for converting an output from the temperature sensor 12 into a digital data to be supplied to a CPU 1. Then, data relating to temperature of each thermal line head can be obtained by means of the temperature sensor provided on each of the plurality of thermal line heads. Further, as shown in FIG. 5, the ink jet printer of the present embodiment is provided with a dummy data insertion circuit 95, which is disposed between a parallel/serial converter 93 of the line head controller 9 and a serial/parallel converter 81 of the line head driver 8, and a dummy data setting register 96 for setting whether or not the dummy data is inserted and for setting where the dummy data is inserted. The setting in the register 96 is controlled by the CPU 1. Still further, in each thermal line head 7 of the present embodiment, an electro-thermal conversion element is disposed to generate heat energy in an ink passage provided corresponding to each ink ejection port, and by applying a voltage pulse to the electro-thermal heat conversion element to drive, an air bubble is generated by utilizing the generated heat energy, and the ink is ejected by pressure of the bubble.

A registration adjustment of each head according to the arrangement shown in FIG. 4 and FIG. 5 will be described below.

Periodically or after each completion of a predetermined operation in the printer, the CPU 1 detects outputs of temperature sensors 12K, 12C, 12M and 12Y as temperatures of the individual thermal line heads 7K, 7C, 7M, and 7Y through the AD converter 13. When it is determined that the temperature difference between any two thermal line heads is a temperature corresponding to a thermal expansion causing the deviation of, for example, greater than or equal to ½ pitch, setting is performed in the dummy data setting register 96 corresponding to a lower temperature thermal line head so that a dummy data is inserted into data for the lower temperature thermal line head.

Figure 6A:
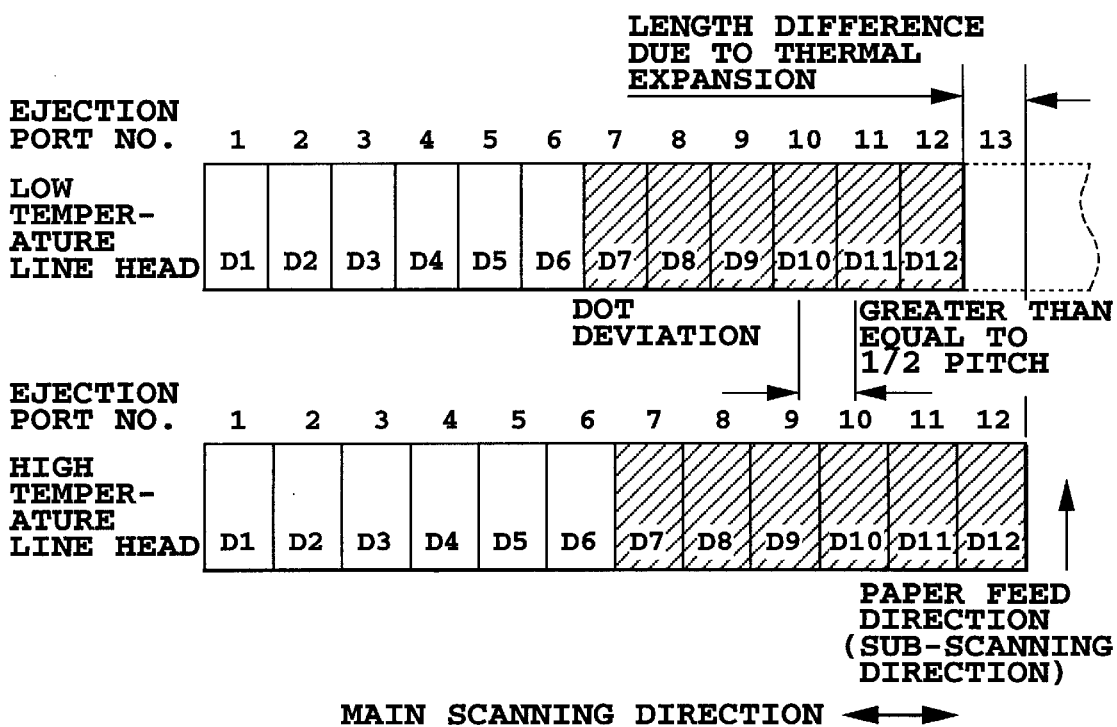
FIGS. 6A and 6B are schematic views for explaining reduction of dot deviation by dummy data insertion according to an embodiment of the present invention.
Figure 6B:
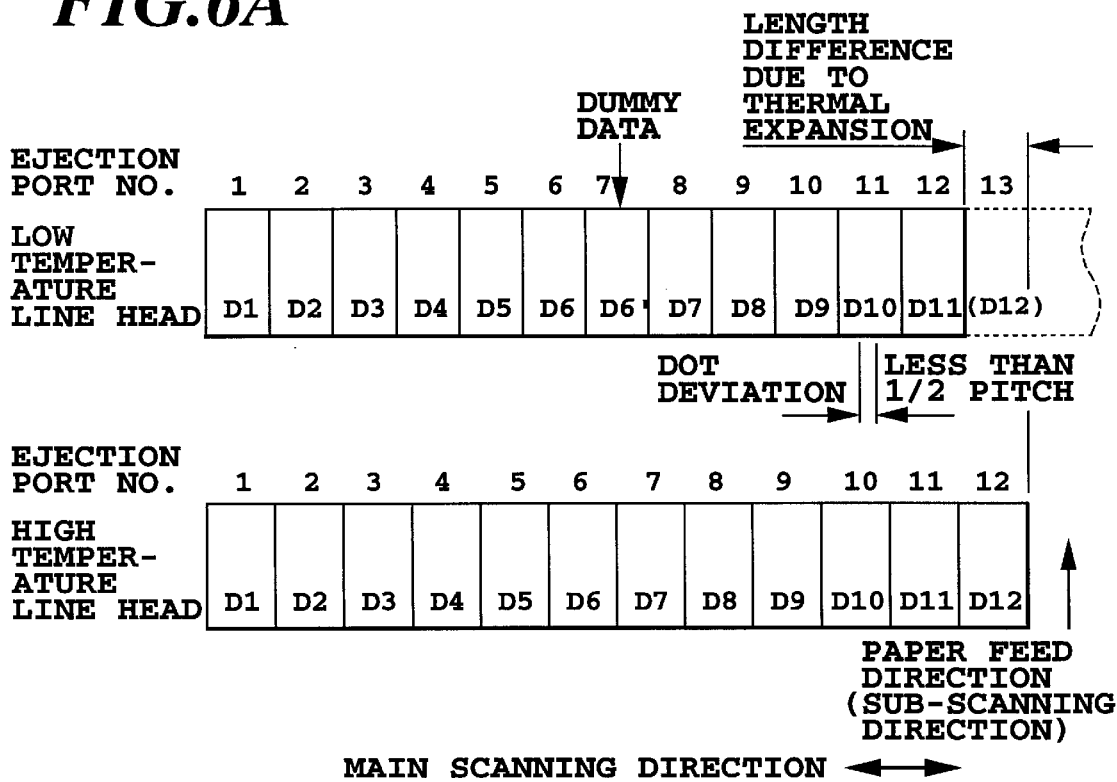

FIGS. 6A and 6B are schematic views for explaining details of dummy data insertion. For simplicity of the explanation, the FIGS. show only two heads differing in temperature and differing in length changes thereof due to thermal expansion, and having 12 ejection ports. However, a number of ejection ports is not limited to this number, and when four heads are provided as in the present embodiment, in relation to the head of the largest thermal expansion, the dummy data is inserted into the data for the respective heads of smaller thermal expansion according to the respective length difference due to the thermal expansion as, described below. Further, in the Figures, a shape of the ejection port is conveniently rectangular form, it is apparent that the shape of the ejection port is not limited to this form. Yet further, eject data D1 to D12 corresponding to the individual ejection ports means data for ejecting/not ejecting the ink to the same positions on the printing medium, and it is apparent that the data of the same number among the individual heads does not always represent data of same content.

FIG. 6A shows a case where lengths of the thermal heads differ from each other owing to thermal expansion difference caused by temperature difference between individual heads. More specifically, a deviation of greater than or equal to ½ pitch is produced in the seventh and succeeding ejection ports, which results in a deviation of greater than or equal to ½ pitch is produced in formed dots. That is, it is desirable that the dots formed by the ejection ports of the same number have no deviation, however, the dots formed by ejection ports after seventh port individually have deviations of greater than or equal to ½ pitch.

On the other hand, as shown in FIG. 6B, a dummy data D6' is assigned to the seventh ejection port which begins to produce the deviation of greater than or equal to ½ pitch in the lower temperature line head, in place of the original ejection data D7. More specifically, the dummy data D6' is inserted between ejection data D6 and D7 by the dummy data insertion circuit 95. By this dummy data insertion, to No. 8 to No. 12 ejection ports in low temperature line head, ejection data D7 to D11 which are shifted by one ejection port unit are assigned, respectively.

As a result, the respective dots formed by ink ejected the low temperature line head and the respective dots formed by ink ejected by the high temperature line head respectively based on ejection data D1 to D11 can all be overlapped with a deviation less than ½ pitch to each other. Thereby, degradation of image quality caused by position deviation of the corresponding ejection ports can be suppressed. It is preferable that the inserted dummy data D6' is set to data of "not ejection" in all cases, or the same as D6 of immediately before. In the present embodiment, No. 12 ejection port of the high temperature line head performs ejection based on data D12.

A dummy data insertion position is determined as a position of the first ejection port where the expansion first becomes greater than or equal to ½ pitch, based on thermal expansion coefficient of the head and the head temperature as shown below.

$$M=1/(2\times A\times\Delta T)$$

here, M: ejection port number to which dummy data is assigned.
A: linear expansion coefficient of a thermal line head
ΔT: temperature difference from temperature of a highest temperature thermal head For example, when a material of the base plate of the thermal line head is aluminum as in the above example, that is $A=2\times10^{-5}/°$ C., and $\Delta T=10.4°$ C., M equals about 2400. In this case, with respect to the thermal line in a head for A4-sized paper, the dummy data is assigned almost at a center in the ejection port arrangement.

When a usually unused ejection port (No. 13) exists in the low temperature line head, by assigning data D12 to this ejection port, image quality degradation at image end portion can be suppressed.

Further, when the thermal expansion is large and a plurality of dummy data must be inserted, the dummy data insertion position is determined as follows.

$$M_n=(2\times n-1)/(2\times A\times\Delta T)$$

here, $M_n$: ejection port number to which n'th dummy data is assigned, $n\geq 2$; the dummy data is not assigned when Mn is greater than number of ejection ports of thermal line head.

In this case, the dummy data setting register 96 is necessary to have a plurality of registers for each head so that a plurality of ejection port positions can be set. A maximum number of dummy data to be inserted may be determined from an expected largest temperature difference between thermal heads, linear expansion coefficient, length of a single ejection port (=resolution), and the number of ejection ports. That is, it is determined from how long (maximum temperature difference)×(linear expansion coefficient)×(resolution)×(number of ejection ports) is measured in terms of a number of ejection ports.

As described above, with the present embodiment, since a dummy data is inserted into driving data for individual printing elements according to each temperature of a plurality of print heads, even if a difference of thermal expansion due to temperature difference of individual heads is generated, and a position deviation greater than a predetermined value occurs in the corresponding printing elements between individual heads, the printing elements driven by corresponding driving data can be shifted between individual heads, thereby suppressing position deviation of dots formed according to the individual corresponding driver data to less than a predetermined value.

As a result, a good printing result with suppressed degradation of print quality can be obtained.

It should be noted that an arrangement for obtaining the temperature of the thermal line head is not limited to the arrangement described in the above embodiment in which arrangement the temperature of each thermal line head is detected by means of the temperature sensor and control of the driving data is performed on a basis of the temperature detected. Alternatively, the temperature of the thermal line head may be estimated based on a number of driving data supplied to the printing element, a temperature of an environment and the like, and the control of the driving data may be performed on a basis of the temperature estimated.

What is claimed is:

1. A printing apparatus in which a plurality of print heads, each having a plurality of printing elements arranged in a predetermined direction, are arranged in a direction along which a relative movement between the print heads and a printing medium is performed, and which performs printing of an image on the printing medium, by using the plurality of print heads so that each of the plurality of print heads scans on a same area of the printing medium while performing the relative movement, said apparatus comprising:

head temperature data obtaining means for obtaining temperature data from each of the plurality of print heads;

driving data supply means for supplying driving data, for driving the plurality of printing elements of each of the plurality of print heads, to each of the plurality of print heads in accordance with an arrangement of the plurality of printing elements;

judging means for judging thermal expansion of respective print heads based on the temperature data obtained by said head temperature data obtaining means; and dummy data insertion means for inserting dummy data into the driving data supplied by said driving data supply means based on a judging result from said judging means as to whether respective differences in thermal expansion between the print heads are greater than a predetermined value.

2. A printing apparatus as claimed in claim 1, wherein said dummy data insertion means inserts the dummy data into the driving data in accordance with the respective differences in thermal expansion between the plurality of print heads, said differences in thermal expansion respectively corresponding to the temperature data of the plurality of print heads.

3. A printing apparatus as claimed in claim 2, wherein, in relation to a print head of which temperature data is obtained indicating a highest temperature between the plurality of the print heads, said dummy data insertion means inserts the dummy data into the driving data for a print head for which temperature data is obtained indicating a lower temperature than the highest temperature.

4. A printing apparatus as claimed in claim 3, wherein said dummy data insertion means inserts the dummy data into the driving data when a difference in thermal expansion calculated based on a temperature difference between the lower temperature and the highest temperature is greater than or equal to a predetermined value.

5. A printing apparatus as claimed in claim 4, wherein said dummy data insertion means inserts the dummy data as driving data for a printing element in the print head of the lower temperature when a deviation of a position of said printing element in the arrangement of the plurality of printing elements from a position of a corresponding printing element in a print head of the highest temperature first becomes a value greater than or equal to the predetermined value.

6. A printing apparatus as claimed in claim 5, wherein the plurality of printing elements of each of the plurality of print heads are arranged in accordance with a width of the printing medium when fed into said printing apparatus.

7. A printing apparatus as claimed in claim 6, wherein the plurality of print heads perform printing of at least one of yellow, magenta, cyan, and black colors from corresponding ejection ports.

8. A printing apparatus as claimed in claim 7, wherein said head temperature data obtaining means includes a temperature sensor provided on at least one of the plurality of print heads.

9. A printing apparatus as claimed in claim 8, wherein the plurality of print heads individually have ink ejection ports as respective printing elements, and an ink is ejected from said ink ejection port by a pressure of a bubble produced by utilizing heat energy generated by a heat generating element.

10. A printing apparatus as claimed in claim 5, wherein each of the plurality of print heads has an excess printing element corresponding to a recording distance greater than a width of the image, and said driving data supply means supplies the driving data shifted due to inserting of the dummy data as the driving data for said excess printing element.

11. A printing apparatus as claimed in claim 1, wherein the dummy data is a data indicating non-printing.

12. A printing apparatus as claimed in claim 1, wherein the dummy data has a same content as driving data adjacent to said dummy data.

13. A position deviation adjusting method for use with a printing apparatus using a plurality of print heads to record an image, each print head having a plurality of printing elements arranged in a predetermined direction, and performing printing on a printing medium, said method comprising the steps of:

obtaining a temperature data corresponding to each of the plurality of print heads;

judging thermal expansion of respective print heads based on the temperature data obtained in said obtaining step;

judging as to whether respective differences in thermal expansion between the print heads are greater than a predetermined value; and inserting dummy data into driving data supplied to a print head, which has a smaller thermal expansion than that of a print head having a greatest thermal expansion of the plurality of print heads, when a plurality of differences in thermal expansion become greater than the predetermined value.

\* \* \* \* \*

UNITED STATES PATENT AND TRADEMARK OFFICE
CERTIFICATE OF CORRECTION

PATENT NO. : 5,966,149

DATED : October 12, 1999

INVENTOR(S): MASASHI KAMADA, ET AL.

Page 1 of 2

It is certified that error appears in the above-identified patent and that said Letters Patent is hereby corrected as shown below:

ABSTRACT [57]

Line 7, "ports" should read --ports.--.

COLUMN 1

Line 30, "FIG.," should read --FIG. 1,--.
    Line 34, "used" should read --use--.
    Line 64, "FIG." should read --FIG. 2--.

COLUMN 4

Line 22, "the each" should read --each--.

COLUMN 5

Line 55, "expansion as," should read --expansion, as--.
    Line 56, "is" should read --is of a--.
    Line 63, "same" should read --the same--.

UNITED STATES PATENT AND TRADEMARK OFFICE
CERTIFICATE OF CORRECTION

PATENT NO. : 5,966,149
DATED : October 12, 1999
INVENTOR(S): MASASHI KAMADA, ET AL.

It is certified that error appears in the above-identified patent and that said Letters Patent is hereby corrected as shown below:

<u>COLUMN 6</u>

Line 19, "ejected the" should read
--ejected by the--.

Signed and Sealed this

Sixth Day of March, 2001

Attest:

NICHOLAS P. GODICI

Attesting Officer

Acting Director of the United States Patent and Trademark Office